April 20, 1954     E. L. STREMPEL     2,675,946
FLUID MEASURING AND DISPENSING MEANS
Filed April 2, 1951     3 Sheets-Sheet 1

EDWARD L. STREMPEL
*INVENTOR.*
BY

April 20, 1954  E. L. STREMPEL  2,675,946
FLUID MEASURING AND DISPENSING MEANS
Filed April 2, 1951  3 Sheets-Sheet 2

EDWARD L. STREMPEL
INVENTOR.

April 20, 1954  E. L. STREMPEL  2,675,946
FLUID MEASURING AND DISPENSING MEANS
Filed April 2, 1951  3 Sheets-Sheet 3

EDWARD L. STREMPEL
INVENTOR.

BY
attorney

Patented Apr. 20, 1954

2,675,946

UNITED STATES PATENT OFFICE 2,675,946

FLUID MEASURING AND DISPENSING MEANS

Edward L. Strempel, Bedford Village, N. Y.

Application April 2, 1951, Serial No. 218,859

8 Claims. (Cl. 222—137)

This invention relates to fluid measuring and dispensing means or apparatus, wherein two liquids are measured, mixed and dispensed, and the primary object of the invention is to provide accurate measurement of predetermined quantities of fluids and their dispensing by positive acting mechanisms of comparative simplicity of construction in comparison with similar mechanisms now in use, as well as to provide mechanisms of this type which utilize a minimum amount of power.

While the measuring and dispensing apparatus of the present invention is particularly adaptable for use in coin controlled automatic beverage dispensing machines, wherein two fluids are measured, mixed and dispensed, it is also applicable for numerous other uses such as the measuring of liquids or fluids in chemical plants, bottling of drugs, etc.

More specifically the present invention relates to the combination of a pump for pumping a multiple number of separated fluids, one or more of which may or may not be under pressure, and novel control valves the operation of which control the operation of the pump and the inlet and discharge of the fluids to and from the pump.

With these and other objects in view, as may appear from the accompanying specification, the invention consists of various features of construction and combination of parts, which will be first described in connection with the accompanying drawing which shows the fluid measuring and dispensing means in section and partly in side elevation, and the features forming the invention will be specifically pointed out in the claims.

While the mechanism disclosed in Figures 1 to 3 of the drawings is particularly adaptable for use in beverage vending machines, preferably coin operated, and it is so described in the following specification, it is to be understood that the invention is not limited thereto, but may be employed in other uses and systems where adaptable.

Figure 1:
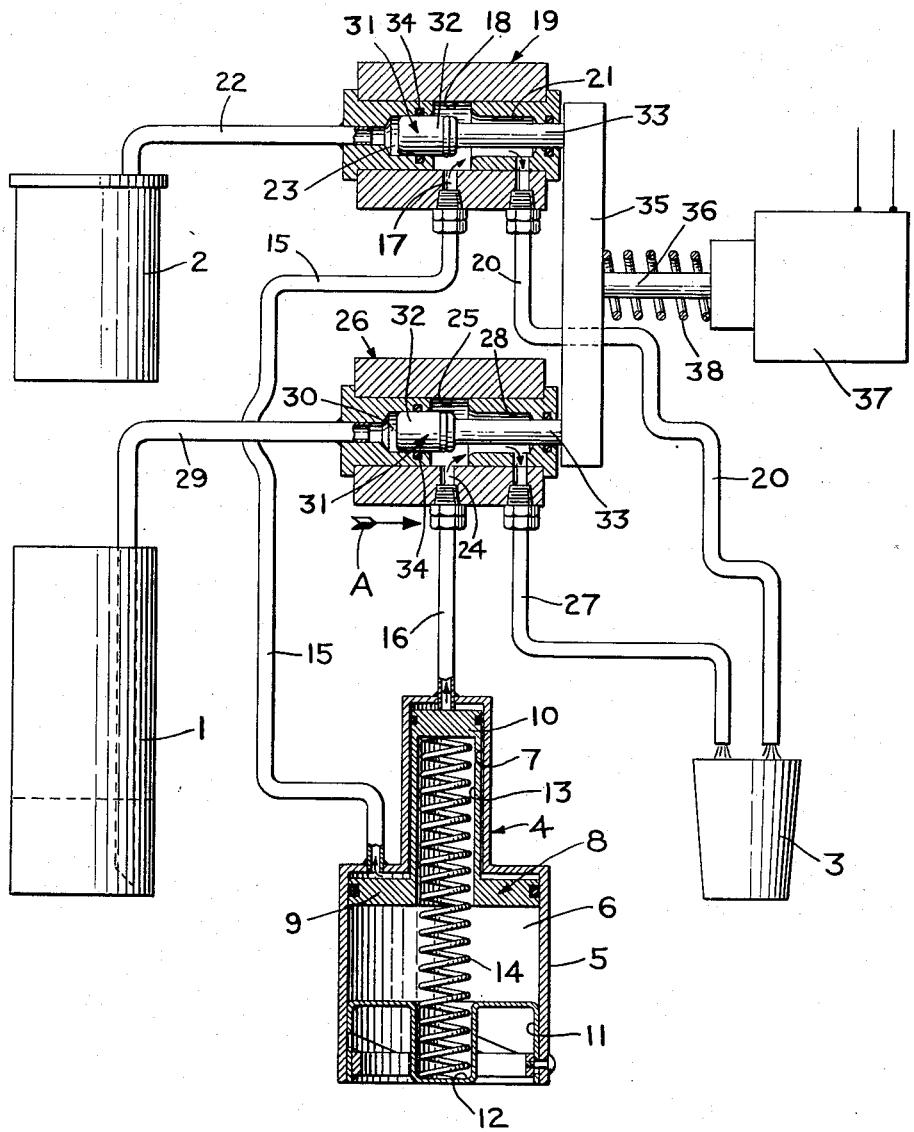
Figure 1 shows one form of the fluid measuring and dispensing apparatus partly in section and partly in side elevation, this form of the invention being adaptable for use with fluids one of which is under a predetermined pressure.

In the construction shown in Figure 1, 1 indicates a container for flavoring fluid such as the various syrups employed in the making of soft non-alcoholic beverages. A second container 2 is provided for containing carbonated water which is mixed with the flavoring fluid or syrup from the container 1 to provide the mixed finished drink which is delivered to a dispensing cup as shown at 3.

A measuring pump 4 is provided which comprises a housing 5. The housing 5 has two cylinders, 6 and 7, therein which are of different diameters and of different capacities, the capacities of the cylinders being regulated to provide the proper proportions of the flavoring fluid and the carbonated water when they are mixed in the dispensing cup 3.

A piston 8 is mounted for reciprocatory movement in the housing 5 and it comprises a large section 9 and the section 10 of reduced diameter each of which piston sections move in the cylinders 6 and 7, respectively. The outer end of the large cylinder 6 is closed by a head or closure 11 of any suitable construction which is provided with a spring well 12 therein. The piston 7 also has a spring well 13 therein. A spring 14 has its ends seated in the wells 12 and 13 and it is tensioned to move the piston 8 in fluid discharging motion in the respective cylinders.

Each of the cylinders 6 and 7 has a single conduit connected thereto, namely, the conduits 15 and 16 which serve both as inlet and discharge conduits for the cylinders. The conduit 15 opens through a port 17 in the central enlarged portion 18 of the cylinder bore of a valve structure 19. A discharge conduit 20 opens into a reduced portion 21 of the bore of the cylinder of the valve structure 19 and has its discharge into the dispensing cup 3. An inlet conduit 22 opens into the container 2 for the carbonated water and into the reduced portion 23 of the bore of the cylinder of the valve 19.

The conduit 16 opens from the cylinder 7 of the pump structure 4 through a suitable port 24 into the central enlarged portion 25 of the cylinder bore of the valve structure 26 while a syrup or flavoring fluid discharging conduit 27 opens into the reduced portion 28 of the cylinder bore of the valve 26. A syrup or flavoring fluid inlet conduit 29 opens into the reduced portion 30 of the cylinder bore of the valve 26.

The valves 19 and 26 are identical in construction and each of them includes a reciprocatory valve piston 31 which has a head 32 and a stem 33. The heads 32 fit snugly in the reduced portions of the cylinder bores of the valve structures and a fluid seal between the heads and the walls of the reduced portions is provided by means of suitable sealing rings shown at 34. The stems or shafts 33 of the valve pistons are connected for unitary movement by a connector 35. In the drawings the connector 35 is shown connected by suitable rod 36 to a solenoid 37 so that when the solenoid 37 is energized the valve pistons will be moved in the direction indicated by the arrow A, that is, they will be moved so that the inlet conduits 22 and 29 will be connected through the valve cylinder bore and the respective ports to the conduits 15 and 16 to provide fluid inlet connection between the pump cylinders 6 and 7 and the containers 1 and 2. The pressure of the carbonated water in the container 2 is sufficient to overcome the tension of the spring 14 and force the piston 8 of the pump downwardly or inwardly in the cylinders until its inward movement is stopped by engagement of the large piston section 9 with the end closure 11 at which time the pump cylinders will be full of their respective fluids. At the instant that the cylinders are filled with their respective fluids the solenoid 37 is deenergized and a spring 38 acts to move the valve pistons 31 in a reverse direction and into the position shown in the drawings. The movement of the valve pistons under action of the spring 38 opens the reduced portions 21 and 28 of the cylinder bores of the valves to the respective enlarged central portions 18 and 25 and consequently opens the conduits 15 and 16 to the discharge conduits 20 and 27 cutting off communication between the pump cylinders and the containers 1 and 2. Upon relief of the pressure of the carbonated water in cylinder 6 the spring expands moving piston 8 upward or outwardly forcing the respective fluids through the discharge conduits into the dispensing cup 3.

If it is so desired, any suitable means such as an electric motor may be substituted for the solenoid 37 for moving the valves into pump suction or inlet position without departing from the spirit of the present invention.

Figure 2:
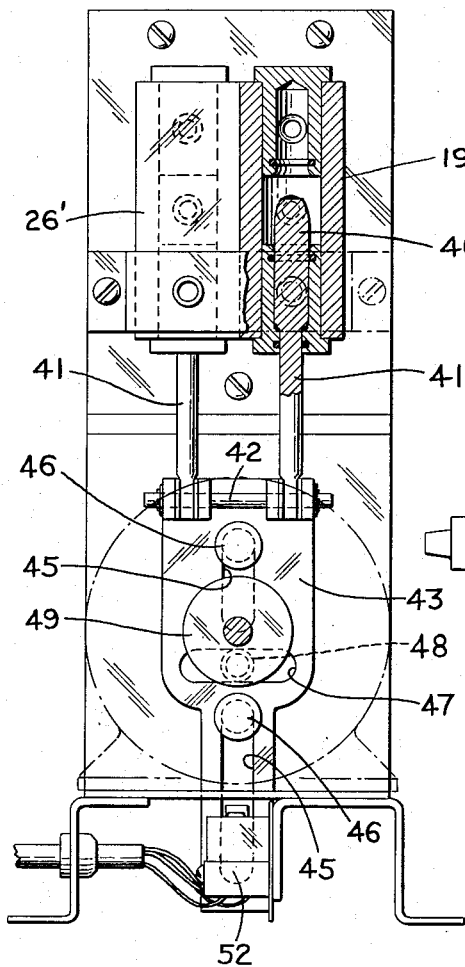
Figure 2 is a view partly in side elevation and partly in section of a modification of the apparatus shown in Figure 1.
Figure 3:
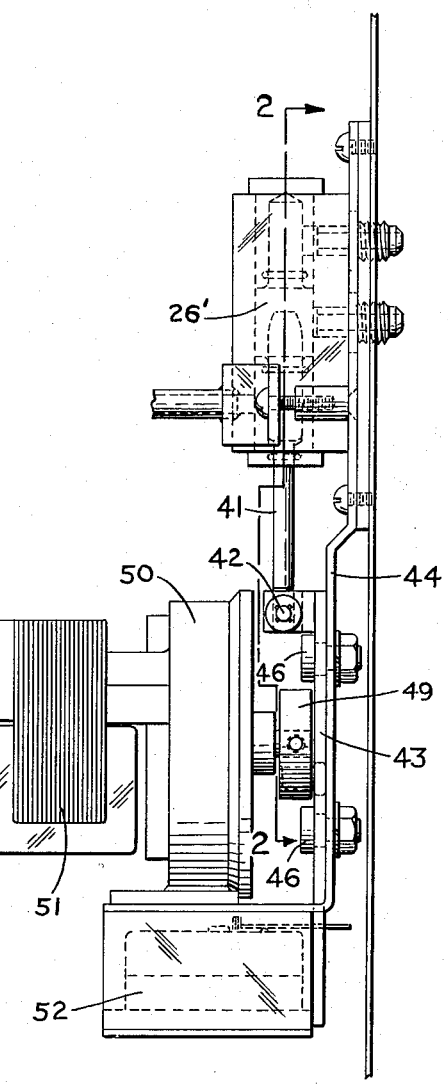
Figure 3 is an edge elevation of the structure shown in Figure 2.

Figures 2 and 3 of the drawings show a construction for operating the valves 19' and 26' by an electric motor in lieu of their operation by a solenoid as shown in Figure 1 of the drawings.

In this form of the invention the valves 19' and 26' are shown as of slightly different construction than the valve structures 19 and 26 but they operate in exactly the same manner and perform the same functions and thus their operation will not be specifically described.

Each of the valves 19' and 26' includes a valve piston 40 which has a stem or shaft 41 connected thereto. The stems or shafts 41 of the valves 19' and 26' are connected by means of a connector 42 for unitary or simultaneous operation or movement of the valve pistons. The connector 42 is in turn attached to or otherwise suitably connected to an operating plate 43 which is slidably supported for longitudinal movement on a support 44 through the medium of slot and pin connections 45 and 46. The operating plate 43 has a transversely extending slot 47 formed therein in which a hardened roller 48 engages. The roller 48 is carried by a disc 49.

The disc 49 is rotated by a gear reduction mechanism 50 of any approved construction which gear reduction mechanism is operated by an electric motor 51. The energizing and deenergizing of the motor 51 is controlled by a switch 52 of any suitable construction depending upon the end use of the valve construction.

Figure 4:
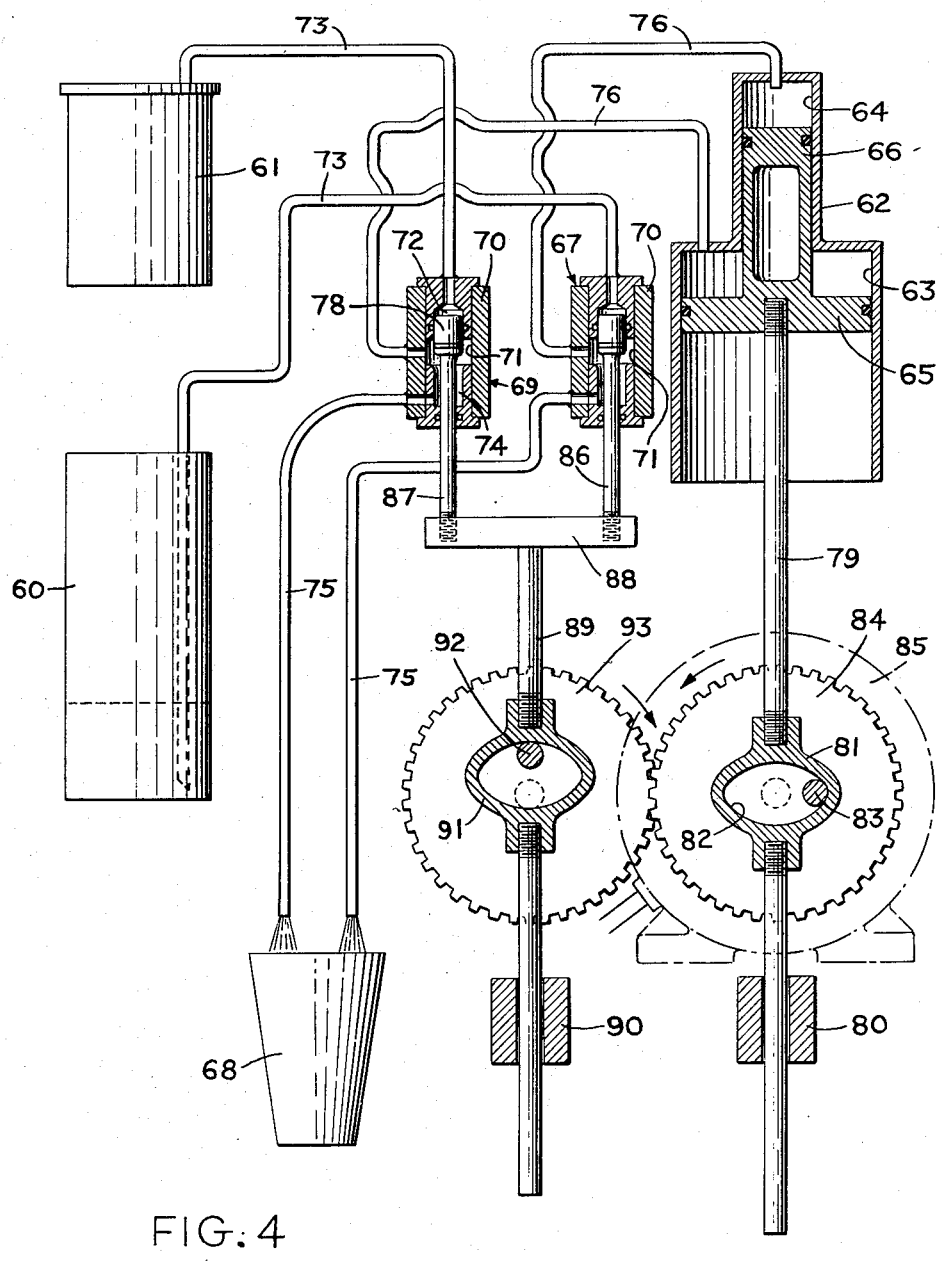
Figure 4 is a view partly in elevation and partly in section showing a modification of the apparatus, wherein the pump and valves are motor operated and which is applicable for use in systems wherein any or none of the fluids may be under pressure.

Figure 4 of the drawings shows a motor operated system similar to that shown in Figure 1 wherein both the pump and the valves are operated by an electric motor. Or, if it is desired, two motors having a proper electrical relation between them may be used in lieu of the single motor operated mechanism shown in Figure 4 of the drawings, this mechanism being merely one form adaptable for use in systems of this kind and especially those wherein none of the fluids to be dispensed are under pressure; although it can, of course, be used in systems where one or more of the fluids are under definite predetermined pressures. In the form shown in Figure 4 of the drawings, 60 and 61 indicate containers for the fluids which are to be dispensed and mixed, and 62 indicates the pump for pumping the fluids. The pump 62 is shown in Figure 4 as a differential cylinder and piston pump embodying a cylinder 63 of relatively large cross sectional area and a cylinder 64 of smaller cross sectional area with pistons 65 and 66 mounted for reciprocatory movement in the respective cylinders. The pistons 65 and 66, like the cylinders 63 and 64, are formed of a unitary construction, but it is to be understood that the invention embraces the idea of two pumping cylinders and two pumping pistons which are connected in any suitable manner for simultaneous operation.

The cylinder 64 is connected through a valve structure 67 with the container 60 and with the outlet of the system from which the two fluids are discharged into a suitable container shown at 68, and the cylinder 63 is connected through a valve structure 69 with a container 61 and the discharge of the system into the container 68. The valves 67 and 69 are the same as the valves illustrated in Figure 1 of the drawings, each comprising a cylinder 70 having an enlarged space or portion 71 of its bore and reduced sections of the bore at each side or end of the enlarged intermediate section 71. One of the end reduced portions, that is, the reduced end portion 72 of the valve cylinder bore has fluid inlet communication through a suitable conduit 73 with the container 61 while the other reduced end portion 74 of the bore has communication with discharge conduit 75. A conduit 76 opens into the enlarged intermediate section 71 of the bore of the cylinder 70 and the conduit 76 of the valve 67 opens into the cylinder 64 while the conduit 76 of the valve 69 opens into the cylinder 63. Thus, in the sequence of operation of the device, fluid is simultaneously pumped from the containers 60 and 61 upon the suction stroke of the pistons 65 and 66 through the conduits 73 into the valves and out through the conduits 76 into the cylinders 63 and 64. During the discharge stroke of the pump pistons 65 and 66 the valve pistons 78 are moved to cut off communication between the conduits 73 and the conduits 76 and to open communication between the conduit 76 and the discharge conduits 75 so that the fluid which has previously been drawn into the cylinders 63 and 64 on the suction stroke of the pump pistons will be discharged through the respective valve structures to the container 68. This is the same operation as that of the mechanism shown in Figure 1.

In the construction shown in Figure 4, the pump pistons 65 and 66 have a connecting rod 79 connected thereto which is guided in its reciprocatory movement by a suitable guide 80. The piston rod 79 has a yoke 81 interposed therein and this yoke is provided with a substantially oval-shaped opening 82, the wall of which is engaged by an eccentric pin 83. The eccentric pin 83 is carried by a gear 84 which is connected to and driven by the electric motor indicated at 85.

The stems or shafts 86 and 87 which are connected to the valve pistons 78 of the valve structure 67 and 69 are connected by a connector 88 so that the valve pistons will be operated in unison. A piston or operating rod 89 is connected to the connector 88 and is guided in its reciprocatory movement by a guide 90. The operating rod 89 has a yoke 91 therein which is of the same construction as the yoke 81 and the inner wall of the opening in the yoke 91 is engaged by an eccentric pin 92 carried by a gear 93. The gear 93 meshes with and is driven by the gear 84. Thus, when the motor 85 operates the piston rod 79 the operating rod 89 will be reciprocated by movement of the eccentric pins around the yokes 82 and 91 to reciprocate the pump pistons 65 and 66 and the valve pistons 78.

It will be noted that the pins 83 and 92 are disposed in 90° relation to each other and that the yokes are so formed and the eccentric pins so related to each other and to the yokes that the valve pistons 78 remain essentially at rest while the pump pistons move through their strokes and the pump pistons remain essentially at rest while the valve pistons go through their stroke. The gears 84 and 93, the yokes 81 and 91 and the eccentric pins 83 and 92 are of such size and related to each other that a predetermined quantity of fluids from the containers 60 and 61 will be delivered to the discharge receiving container 68 for each rotation of the gears 84 and 85.

Any suitable type of stop switch (not shown) is used for controlling energizing of the operating motor 85 so as to provide proper operation of the motor to provide the dispensing of the desired quantities of the respective fluids.

While this Figure 4 of the drawings shows a specific form of operating the pump and valve pistons from a single electric motor, it is to be understood that the invention is not to be limited to the specific construction shown but that many mechanical equivalents thereof may be substituted without departing from the spirit of the present invention.

It will be understood that the invention is not to be limited to the specific construction or arrangement of parts shown, but that they may be widely modified within the invention defined by the claims.

What is claimed is:

1. In a fluid dispensing apparatus, in combination with a plurality of containers for fluid, the fluid in at least one of said containers being under pressure, a multiple cylinder fluid measuring pump having suction connection with said containers, a three-way reciprocatory piston valve connected between each of said containers and the pump and having discharge connections with the pump, means for operating said valves, said pump embodying a spring actuated piston the spring of which is compressed by pressure of the fluid from one of said containers when said valves are open to the containers and pump, said spring expanding to discharge fluid from the pump when said valves are operated to connect the pump to discharge.

2. In a fluid dispensing apparatus, in combination with a plurality of containers for fluid, the fluid in at least one of said containers being under pressure, a multiple cylinder fluid measuring pump having suction connection with said containers, a three-way reciprocatory piston valve connected between each of said containers and the pump and having discharge connections with the pump, means for operating said valves, said pump embodying a spring actuated piston the spring of which is compressed by pressure of the fluid from one of said containers when said valves are open to the containers and pump, said spring expanding to discharge fluid from the pump when said valves are operated to connect the pump to discharge, said valve operating means operating the valves to open the pump to fluid receiving connection with said containers, and spring means for operating said valves to open the valves to discharge connection with the pump.

3. In a fluid dispensing apparatus, in combination with a plurality of fluid containing containers, a pump, said pump comprising measuring cylinders, directly connected pump pistons mounted for simultaneous reciprocatory movement in said cylinders, means for reciprocating said pistons, a plurality of valve structures, inlet conduits connecting said valve structures one to each of said containers, a single conduit connecting each of said valve structures to said pump, discharge conduits connected to said valve structures, reciprocatory valve pistons in said valve structures movable to connect the pump through the valve structures to said discharge conduits, stems on said valve pistons, a connector connecting said stems, and means for moving said connector to move said valve pistons simultaneously.

4. In a fluid dispensing apparatus, in combination with a plurality of fluid containing containers, a pump, said pump comprising measuring cylinders, directly connected pump pistons mounted for simultaneous reciprocatory movement in said cylinders, means for reciprocating said pistons, a plurality of valve structures, inlet conduits connecting said valve structures one to each of said containers, a single conduit connecting each of said valve structures to said pump, discharge conduits connected to said valve structures, reciprocatory valve pistons in said valve structures movable to connect the pump through the valve structures to said discharge conduits, stems on said valve pistons, a connector connecting said stems, a driving motor, and means connecting said motor and said valve pistons for simultaneously moving said valve pistons into pump inlet or discharge positions.

5. In a fluid dispensing apparatus, in combination with a plurality of fluid containing containers, a pump, said pump comprising measuring cylinders, directly connected pump pistons mounted for simultaneous reciprocatory movement in said cylinders, a plurality of valve structures, inlet conduits connecting said valve structures one to each of said containers, a single conduit connecting each of said valve structures to said pump, discharge conduits connected to said valve structures, reciprocatory valve pistons in said valve structures movable to connect the pump through the valve structures to said discharge conduits, stems on said valve pistons, a connector connecting said stems, a driving motor, means connecting said motor and said valve pistons for simultaneously moving said valve pistons into pump inlet or discharge positions, and means connecting said motor to said pump pistons for operating the pump pistons.

6. In a fluid dispensing apparatus, in combination with a plurality of fluid containing containers, a pump, said pump comprising measuring cylinders, pump pistons mounted for reciprocatory movement in said cylinders, a plurality of valve structures, inlet conduits connecting said valve structures one to each of said containers, a single conduit connecting each of said valve structures to said pump, discharge conduits connected to said valve structures, reciprocatory valve pistons in said valve structures movable to connect the pump through the valve structures to said discharge conduits, stems on said valve pistons, a connector connecting said stems, means for moving said connector to move said valve pistons simultaneously, means connecting said pump pistons for unitary movement, and means connecting said motor to said pump pistons for operation of the pump pistons.

7. In a fluid dispensing apparatus, in combination with a plurality of fluid containing containers, a pump, said pump comprising a plurality of measuring cylinders, a pump piston mounted for reciprocatory movement in each of said cylinders, said pump pistons directly connected for unitary movement, a plurality of valve structures, inlet conduits connecting said valve structures one to each of said containers, a single conduit connecting each of said valve structures to a respective cylinder of said pump, discharge conduits connected to said valve structures, reciprocatory valve pistons in said valve structures movable to connect the pump through the valve structures to said discharge conduits, means for reciprocating said pump pistons, means for reciprocating said valve piston, said valve piston operating means and said pump piston operating means correlated whereby the valve pistons remain essentially at rest while the pump pistons are in operation and the pump pistons remain at rest while the valve pistons are in operation.

8. A fluid dispensing apparatus as claimed in claim 7 wherein the means for reciprocating said pump and valve pistons comprises an electric motor, and means driven by said motor and connected to the pump pistons and the valve pistons for providing the cycle of operation of the respective pistons.

References Cited in the file of this patent

UNITED STATES PATENTS

| Number | Name | Date |
|---|---|---|
| 868,322 | Blum | Oct. 15, 1907 |
| 1,027,923 | Spohrer | May 28, 1912 |
| 1,225,699 | Brown | May 8, 1917 |
| 1,360,298 | Johnston | Nov. 30, 1920 |
| 1,372,367 | Pepper | Mar. 22, 1921 |
| 1,454,765 | Patterson | May 8, 1923 |
| 1,912,171 | Austin | May 30, 1933 |
| 2,001,336 | Vago et al. | May 14, 1935 |
| 2,006,879 | Benedek | July 2, 1935 |
| 2,372,360 | Cornelius | Mar. 27, 1945 |
| 2,427,429 | Waite et al. | Sept. 16, 1947 |
| 2,503,376 | Burgess | Apr. 11, 1950 |
| 2,533,281 | Oliveau | Dec. 12, 1950 |
| 2,536,400 | Thompson | Jan. 2, 1951 |
| 2,566,436 | Waite | Sept. 4, 1951 |
| 2,588,217 | De Mille | Mar. 4, 1952 |